US011112258B2

(12) United States Patent
Akselrod et al.

(10) Patent No.: US 11,112,258 B2
(45) Date of Patent: Sep. 7, 2021

(54) ENVIRONMENT BASED NAVIGATION

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/547,085

(22) Filed: Aug. 21, 2019

(65) Prior Publication Data

US 2020/0132484 A1    Apr. 30, 2020

Related U.S. Application Data

(63) Continuation of application No. 16/176,077, filed on Oct. 31, 2018.

(51) Int. Cl.
*G01C 21/34*      (2006.01)
*E05F 15/70*      (2015.01)

(52) U.S. Cl.
CPC .......... *G01C 21/3461* (2013.01); *E05F 15/70* (2015.01); *E05Y 2900/55* (2013.01)

(58) Field of Classification Search
None
See application file for complete search history.

(56) References Cited

U.S. PATENT DOCUMENTS 8,744,766 B2    6/2014    Rakshit
2013/0080053 A1   3/2013    Rakshit

| | | |
|---|---|---|
| 2014/0309864 A1 | 10/2014 | Ricci |
| 2015/0276419 A1 | 10/2015 | Hashem |
| 2017/0067750 A1 | 3/2017 | Day |

(Continued)

FOREIGN PATENT DOCUMENTS

| CN | 104853306 A | 8/2015 |
|---|---|---|
| JP | 2006118981 A | 5/2006 |

OTHER PUBLICATIONS

Zhao, "Vehicle Navigation and Information Systems", Encyclopedia of Electrical & Electronics Engineering, 1st Edition, vol. 23, 1999, p. 106-118 (Year: 1999).

(Continued)

*Primary Examiner* — Tamara L Weber

(74) *Attorney, Agent, or Firm* — Steven M. Bouknight

(57) ABSTRACT

An embodiment of the invention may include a method, computer program product and computer system for environment based navigation. The method, computer program product and computer system may include computing device which may collect environment map data. The environment map data may include one or more environmental zones. The computing device may receive one or more user environment preferences from a user. The user environment preferences may include a user's preferred environmental zones and non-preferred environmental zones. The computing device may receive a destination from the user and determine one or more routes to the destination. The computing device may compare the one or more determined routes to the environment map data and the user environment preferences and display a list of the determined routes based on the user environment preference data.

7 Claims, 7 Drawing Sheets

(56) References Cited

U.S. PATENT DOCUMENTS

2017/0213273 A1 7/2017 Dietrich
2017/0274737 A1 9/2017 Delaruelle
2020/0132483 A1 4/2020 Akselrod

OTHER PUBLICATIONS

"Odor Track'r Program", Copyright 2013 St. Croix Sensory, Inc., 2 pps., http://www.odortrackr.com/.
IBM: List of IBM Patents or Patent Applications Treated As Related (Appendix P), 2 pages.
Odor Track'R™.
Quercia et al., "Smelly Maps: The Digital Life of Urban Smellscapes", Copyright 2015, Association for the Advancement of Artificial Intelligence, 4 pps., http://researchswinger.org/publications/icwsm15_smell.pdf.
Rudgard, "Mapping London's smells:'smellscapes' show which streets stink", 4 pps., Jun. 5, 2015, http://www.telegraph.co.uk/news/earth/environment/11653964/Mapping-Londons-smells-smellscapes-show-which-streets-stink.html.
Swanson, "Beautiful maps of what our cities actually smell like", The Washington Post, 3 pps., https://washingtonpost.com/news/wonk/wp/2015/06/07/maps-what-your-city-smells-like/?utm_term=.7aae41843350.
Traverso, "Learning About Cities by Mapping Their Smells", Dec. 8, 2017, Atlas Obscura, 6 pps., https://www.atlasobscura.com/articles/art-mapping-smell-smellscapes-kate-mclean.
U.S. Appl. No. 16/176,077, entitled "Environment Based Navigation", filed Oct. 31, 2018, P201707537US01, 45 Pages.

ENVIRONMENT BASED NAVIGATION

BACKGROUND

The present invention relates generally to a method, system, and computer program for environment based navigation. More particularly, the present invention relates to a method, system, and computer program for determining a route based on a user's preferred environmental experiences.

GPS has become a near ubiquitous technology used on a variety of devices such as smartphones, cars, and as standalone devices. GPS devices allow users to orient themselves and to plan out travel routes. GPS is a satellite-based radio navigation system that provides geolocation and time information to a GPS receiver anywhere on or near the Earth where there is an unobstructed line of sight to GPS satellites. GPS does not require a user to transmit any data, and it operates independently of any telephonic or internet reception, though these technologies can enhance the usefulness of the GPS positioning information. The GPS provides critical positioning capabilities to military, civil, and commercial users around the world. In addition to GPS, there are other navigation systems with similar capabilities such as the Russian Global Navigation Satellite System (GLONASS), China's BeiDou Navigation Satellite System, the European Union's Galileo positioning system, India's NAVIC, and Japan's Quasi-Zenith Satellite System.

BRIEF SUMMARY

An embodiment of the invention may include a method, computer program product and computer system for environment based navigation. The method, computer program product and computer system may include computing device which may collect environment map data. The environment map data may include one or more environmental zones. The computing device may receive one or more user environment preferences from a user. The user environment preferences may include a user's preferred environmental zones and non-preferred environmental zones. The computing device may receive a destination from the user and determine one or more routes to the destination. The computing device may compare the one or more determined routes to the environment map data and the user environment preferences and display a list of the determined routes based on the user environment preference data.

BRIEF DESCRIPTION OF THE DRAWINGS

FIG. 1b illustrates example operating modules of the environment based routing program of FIG. 1a;

DETAILED DESCRIPTION

Figure 1A:
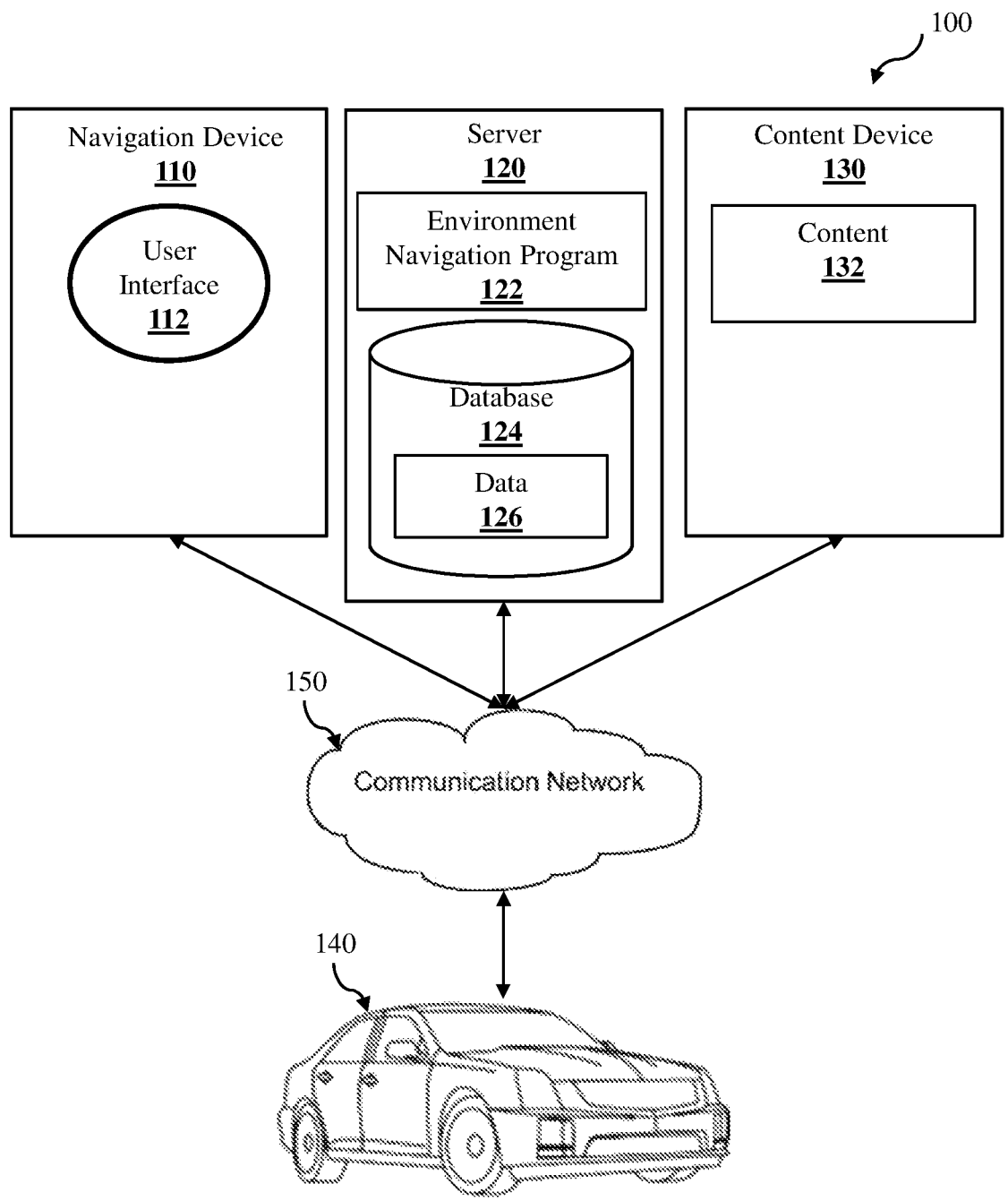
FIG. 1a illustrates a system for environment based routing, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for determining a route based on a user's preferred environmental experiences. Current technology does not allow for navigation based on a user's preferred environmental experiences, such as, but not limited to, sounds, and odors. Currently, there exist odor and sound maps for various locales, but these odor and sound maps do not take into account a user's personal preference or distaste for certain odors or sounds. Further, existing odor and sound maps are not deployed or used in a global positioning system (GPS) or any other navigational program and/or navigational device. Embodiments of the present invention provide a means for incorporating a user's environmental preferences into a navigation method, program, or system and optimizing routes based on the user's environment preferences.

Reference will now be made in detail to the embodiments of the present invention, examples of which are illustrated in the accompanying drawings, wherein like reference numerals refer to like elements throughout. Embodiments of the invention are generally directed to a system for environment based routing.

FIG. 1 illustrates a environment based routing system 100, in accordance with an embodiment of the invention. In an example embodiment, environment based routing system 100 includes a navigation device 110, a server 120, content device 130, and vehicle 140, interconnected via network 150.

In the example embodiment, the network 150 is the Internet, representing a worldwide collection of networks and gateways to support communications between devices connected to the Internet. The network 150 may include, for example, wired, wireless or fiber optic connections. In other embodiments, the network 150 may be implemented as an intranet, a local area network (LAN), or a wide area network (WAN). In general, the network 150 can be any combination of connections and protocols that will support communications between the navigation device 110, the server 120, the content device 130 and the vehicle 140.

The navigation device 110 may include a user interface 112. In the example embodiment, the navigation device 110 may be a global positioning system (GPS) device, or any other navigational device or computing system capable of storing, compiling, and organizing audio, visual, or textual content and receiving and sending that content to and from other computing devices, such as the server 120, the content device 130 and the vehicle 140 via the network 150. In some embodiments, the navigation device 110 includes a collection of devices or data sources. The navigation device 110 is described in more detail with reference to FIG. 4.

The user interface 112 includes components used to receive input from a user on the navigation device 110 and transmit the input to the environment navigation program 122 residing on the server 120, or conversely to receive information from the environment navigation program 122 and display the information to the user on the navigation device 110. In an example embodiment, the user interface 112 uses a combination of technologies and devices, such as device drivers, to provide a platform to enable users of the navigation device 110 to interact with the environment navigation program 122. In the example embodiment, the user interface 112 receives input, such as but not limited to, textual, visual, or audio input received from a physical input device, such as but not limited to, a keypad, mouse, and/or a microphone.

The server 120 includes environment navigation program 122 and database 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as the navigation device 110, the content device 130, and the vehicle 140 via network 150. In an example embodiment, the server 120 may be resident in the navigation device 110. Server 120 is described in more detail with reference to FIG. 4.

The environment navigation program 122 is a program capable of receiving a user's environmental preferences and determining one or more routes to a destination based on the user's environmental preferences. For example, the navigation device 110 may incorporate content 132, such as, but not limited to, an environment map which maps out environmental zones. Environment maps may include, but are not limited to, odor maps and sound maps. Environmental zones may be areas defined or characterized by, or associated with, a particular environmental sensation such as, but not limited to, a scent, or a sound. An environmental zone may be associated with a particular sensation even though the strength of the sensation may vary over time and may not be present at all times. Further, environment maps may be derived from, for example, but not limited to, crowd-sourced data, and studies. The environment maps may be received and/or collected from the content device 130, which is explained in more detail below with reference to the content device 130 and content 132. For example, an environment map may be an odor map which includes distinct environmental zones associated with particular odors such as, but not limited to, pollution, auto emissions, flowers, trees, animals, etc. The environment navigation program 122 may receive a user's environmental preferences, for example, not limited to, a user's preferred odors and sounds, and a user's non-preferred odors and sounds. For example, a user may input a list of odors the user likes and a list of odors the user dislikes. For example, but not limited to, a user may indicate a preference for flowers or forest odors and a dislike for auto emissions and pollution smells. The environment navigation program 122 may then receive a destination input from a user and determine a route based on the user's environmental preferences and other data, such as distance, traffic, congestion, construction, and expected travel time. The determined route may be a route that minimizes travel time while completely avoiding undesirable environmental zones. However, it is not required that the determined route be a best or optimal route. In various embodiments, the determined route may be a route that, in comparison to known routing methods, shortens but does not completely minimize travel time or a route that avoids some but not all undesirable environmental zones. For example, a user may input his/her destination as Manchester, Vt., the environment navigation program 122 determines one or more routes to Manchester, Vt. that seek to optimize the user's preferred senses, while seeking to minimize distance or travel time. Thus, if a user's environmental preferences include a preference for nature scents, the environment navigation program 122 may suggest more rural routes and avoid more congested routes to optimize the user's environmental preferences. In another embodiment of the invention, the environment navigation program 122 is capable of detecting an environmental zone on a route and alerting the user to the environmental zone. For example, the environment navigation program 122 may not be able to avoid all instances of a user's non-preferred environmental preferences, but environment navigation program 122 may alert the user that he/she is in or approaching a non-preferred environmental zone. For example, there may only be a single route to a destination and that single route may pass through a non-preferred environmental zone, such as, but not limited to, a polluted odor zone. Thus, the environment navigation program 122 may alert the user that he/she is in a polluted odor zone or that a polluted odor zone approaching. In yet another embodiment of the invention, the environment navigation program 122 may adjust the settings of the vehicle 140 based on the user's environmental preferences and/or the detection of an environmental zone. For example, if the environment navigation program 122 detects that the user is approaching a non-preferred environmental zone, the environment navigation program 122 may adjust the setting of the vehicle 140 such as, but not limited to, causing the windows of the vehicle 140 to close, or switching the air system of the vehicle 140 to re-circulate the cabin air.

The database 124 may store the data 126. The data 126 may be any data, such as, but not limited to, audio, visual, or textual data, associated with or obtained via the environment navigation program 122 and navigation device 110. Data 126 may include, but is not limited to, map data, environment map data, environmental zone data, user environment preference data, default environment preference data, environment navigation program 122 data, and GPS location data. The database 124 is described in more detail above and with reference to FIG. 4.

Content device 130 may contain content 132. Content device 130 may be a desktop computer, a notebook, a laptop computer, a tablet computer, a handheld device, a smartphone, a thin client, or any other electronic device or computing system capable of storing audio, visual, or textual content and receiving and sending that content to and from other computing devices such as the navigation device 110, the server 120, the vehicle 140 via network 150. In some embodiments, the content device 130 includes a collection of devices, or data sources, in order to collect audiovisual content. The content device 130 is described in more detail with reference to FIG. 4.

Content 132 may be a collection of audiovisual content including, but not limited to, audio, visual, and textual content. Content 132 may be, for example, environment map data including, but not limited to, crowd-sourced odor maps, crowd-sourced sound maps, odor map studies, and sound map studies, etc. Content 132 is located on the content device 130 and can be accessed via network 150. In accordance with an embodiment of the invention, content 132 may be located on one or a plurality of content devices 130.

The vehicle 140 may be any vehicle including, but not limited to, a passenger car, a motorcycle, a commercial vehicle, a boat or any other motor vehicle capable of communicating with the navigation device 110 via the network 150. In one embodiment of the invention the navigation device 110 may be hardwired into the vehicle 140 which communicates with the vehicle 140 via the network 150. In yet another embodiment of the invention, the navigation device 110 may be a separate device which communicates with the vehicle 140 via the network 150.

Figure 1B:
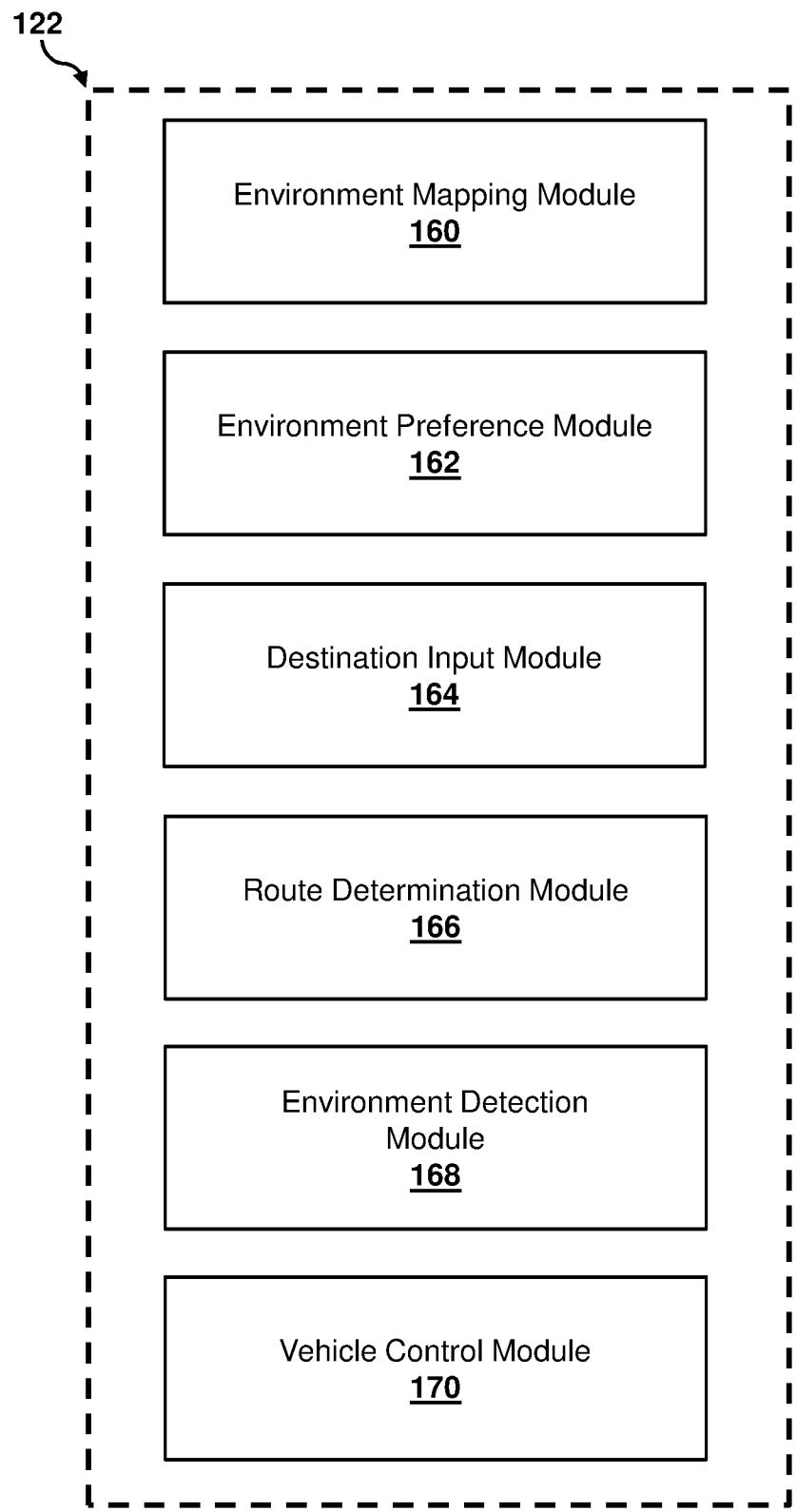

FIG. 1b illustrates example modules of the environment navigation program 122. In an example embodiment, the environment navigation program 122 may include six modules: environment mapping module 160, environment preference module 162, destination input module 164, route determination module 166, environment detection module 168, and vehicle control module 170.

The environment mapping module 160 collects the content 132 contained within the content device 130. The environment mapping module 160 may collect the content 132 and store the content 132 in the database 124 where the content 132 will be part of the data 126. For example, the environment mapping module 160 may collect environment maps from the content device 130.

The environment preference module 162 receives environment preferences from a user using the navigation device 110. A user may enter his/her environment preferences using the user interface 112 on the navigation device 110. For example, a user may enter his/her environment preferences such as, but not limited to, preferred odors, preferred sounds, non-preferred odors, and non-preferred sounds. Thus, a user may create a list of preferred odors including, but not limited to, flowers, trees, farm odors, etc. A user may also create a list of non-preferred odors, i.e. odors the user wishes to avoid, including, but not limited to, auto emissions, landfill odors, smoke, pollution, etc. In some embodiments, environment preferences of a user may include default preferences, such as generally understood preferences or preferences in accord with recommendations from public health or other medical authorities, e.g., air pollution as a disfavored sensation. The user's environment preferences may be stored in the data 126 resident on the server 120.

The destination input module 164 receives a destination from a user using the navigation device 110. A user may enter a destination using the interface 112 on the navigation device 110. In one embodiment of the invention, a user may enter a specific destination such as, but not limited to, an address, a postal code, coordinates, i.e. longitude and latitude, or a place name, e.g. a hotel name or a landmark, etc. Further, the destination may be a saved route, stored in the data 126, that the user has taken before. In another embodiment of the invention, a user may enter a desired or disfavored environmental input the user would like to experience or avoid. For example, a user may enter a specific type of odor, such as, but not limited to, a specific type of flower or tree the user would like to smell.

The route determination module 166 determines one or more routes to the received destination utilizing the data 126 stored on the database 124. The route determination module 166 may determine one or more routes to the received destination optimizing routes with the user's preferred environmental zones and minimizing routes with the user's non-preferred environmental zones. For example, a user may enter a destination, such as, but not limited to Manchester, Vt., and the route determination module 166 may determine there are three possible routes from the user's current location. The route determination module 166 determines which of the three routes would take the user through more preferred environmental zones and less non-preferred environmental zones. The route determination module would then present the routes in a ranked list with the route with the most preferred environmental zones first. The environment preference ranked list may include travel time or distance. In an alternative embodiment, a user may enter a preferred environmental zone as a destination and the route determination module 166 determines the closest preferred environmental zone to the user's current location (or a zone closer than most other preferred zones). For example, a user may enter "roses" as a preferred odor zone the user wishes to experience and the route determination module 166 would determine the closest rose odor zone to the user. In another embodiment of the invention, the route determination module 166 may black out all non-preferred environmental zones and not use those blacked out non-preferred environmental zones in the route calculation. The route determination module 166 may not be able to find any routes to the destination that avoid all non-preferred environmental zones and alert the user that no routes exist without going through a non-preferred environmental zone. The user may then select a route from the ranked list of routes. The user may select a route from the ranked list using the user interface 112 on the navigation device 110.

The environment detection module 168 detects when the navigation device 110 enters an environmental zone and alerts the user. For example, the environment detection module 168 may alert the user when the navigation device 110 enters an environmental zone such as, but not limited to, a preferred environmental zone, a non-preferred environmental zone, or an environmental zone not in the user's environment preference data. The environment detection module 168 may alert the user of the detected environmental zone via the user interface 112 of the navigation device 110. For example, auto emissions may be indicted in the user environment preference data as a non-preferred odor zone, the environment detection module 168 may alert the user that an auto emissions odor zone is approaching. In another embodiment of the invention, the environment detection module 168 may operate so long as the navigation device 110 is turned on. For example, the navigation device 110 may be turned on, but the user may not enter a destination or choose a route, the environment detection module 168 may still alert the user of an environmental zone even though a destination or route has not been selected.

The vehicle control module 170 adjusts the settings of the vehicle 140 in response to detecting an environmental zone based on the data 126. For example, but not limited to, the environment detection module 168 may detect the navigation device 110 is entering a preferred odor zone and the vehicle control module 170 may adjust the setting of the vehicle 140 to maximize the user's experience of the preferred odor zone. The vehicle control module 170 may for example, but not limited to, open the windows of the vehicle 140, or turn on the air intake of the vehicle 140, etc. In another example, the environment detection module 168 may detect a non-preferred odor zone and the vehicle control module 170 may adjust the settings of the vehicle 140 by for example, but not limited to, closing the windows of the vehicle 140, or switching the air intake to re-circulation mode, etc. The vehicle control module 170 may adjust the settings of vehicle 140 according to a user's preferences or according to default settings of the environment navigation program 122.

Figure 2:
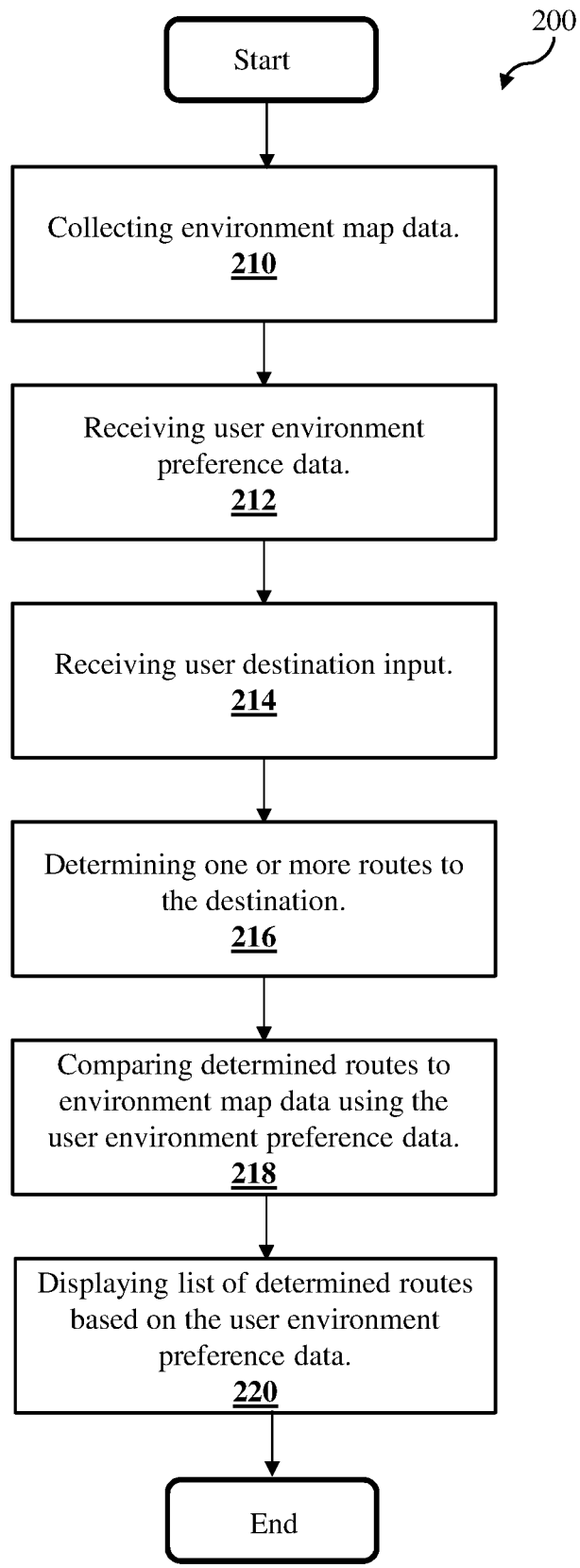
FIG. 2 is a flowchart illustrating an example method of the environment based routing in accordance with an embodiment of the invention.

Referring to FIG. 2, a method 200 for environment based routing is depicted, in accordance with an embodiment of the present invention.

Referring to block 210, the environment mapping module 160 collects the content 132 from the content device 130. Content collection is described in more detail above with reference to the environment mapping module 160 and the content 132.

Referring to block 212, the environment preference module 162 receives environment preferences from a user using the navigation device 110. Environment preferences and receival thereof are described in more detail above with reference to the environment preference module 162.

Referring to block 214, the destination input module 164 receives a destination from a user using the navigation device 110. Destination input is described in more detail above with reference to the destination input module 164.

Referring to block 216, the route determination module 166 determines one or more routes to the received destination utilizing the data 126 stored on the database 124. Route determination is described in more detail above with reference to the route determination module 166.

Referring to block 218, the route determination module 166 compares the determined one or more routes to the data 126. Route comparison is described in more detail above with reference to the route determination module 166.

Referring to block 220, the route determination module 166 displays a ranked list of the determined one or more routes based on the data 126. Route ranking is described in more detail above with reference to the route determination module 166.

Figure 3:
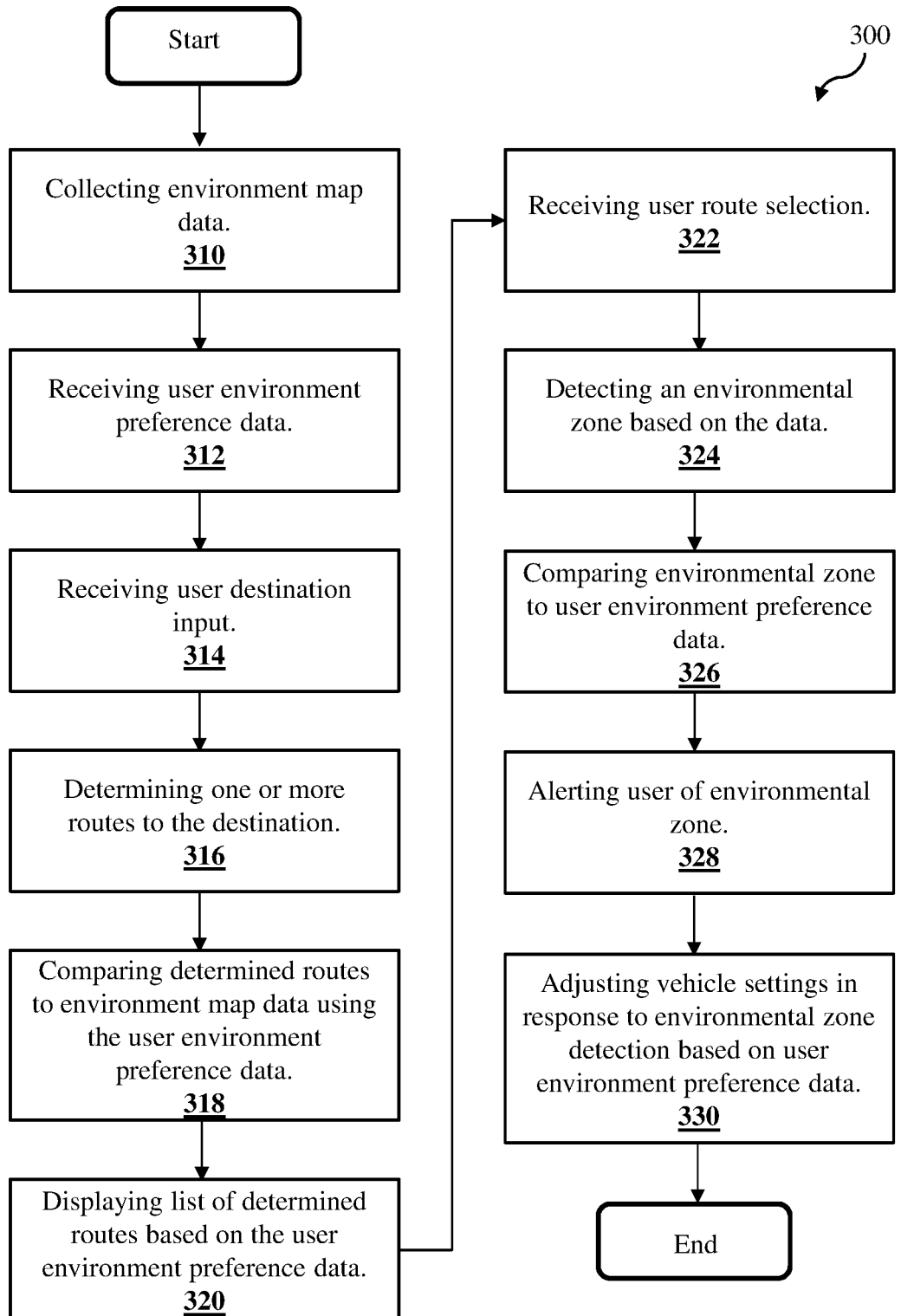
FIG. 3 is a flowchart illustrating an example method of the environment based routing, in accordance with an embodiment of the invention.

Referring to FIG. 3, a method 300 for environment based routing is depicted, in accordance with an embodiment of the present invention. FIG. 3 is substantially similar to FIG. 2 with blocks 310-320 being identical to blocks 210-220; however, FIG. 3 also includes the addition of blocks 324-330.

Blocks 310-320 are the same as blocks 210-220, respectively.

Referring to block 322, the environment navigation program 122 receives a user's route selection. Route selection is described in more detail above with reference to the route determination module 166.

Referring to block 324, the environment detection module 168 detects when the navigation device 110 enters an environmental zone based on the data 126. The environment detection module 168 may be programmed to detect, for example, but not limited to, a user's non-preferred environmental zones, a user's preferred environmental zones, or all environmental zones. Environmental zone detection is described in more detail above with reference to the environment detection module 168.

Referring to block 326, the environment detection module 168 compares the detected environmental zone to the user' environment preference data. Environmental zone comparison is described in more detail above with reference to the environment detection module 168.

Referring to block 328, the environment detection module 168 alerts a user of the detected environmental zone. Environmental zone alerting is described in more detail above with reference to the environment detection module 168.

Referring to block 330, the vehicle control module 170 adjusts the settings of the vehicle 140 in response to detecting an environmental zone based on the data 126. Vehicle setting adjusting is described in more detail above with reference to the vehicle control module 170.

Figure 4:
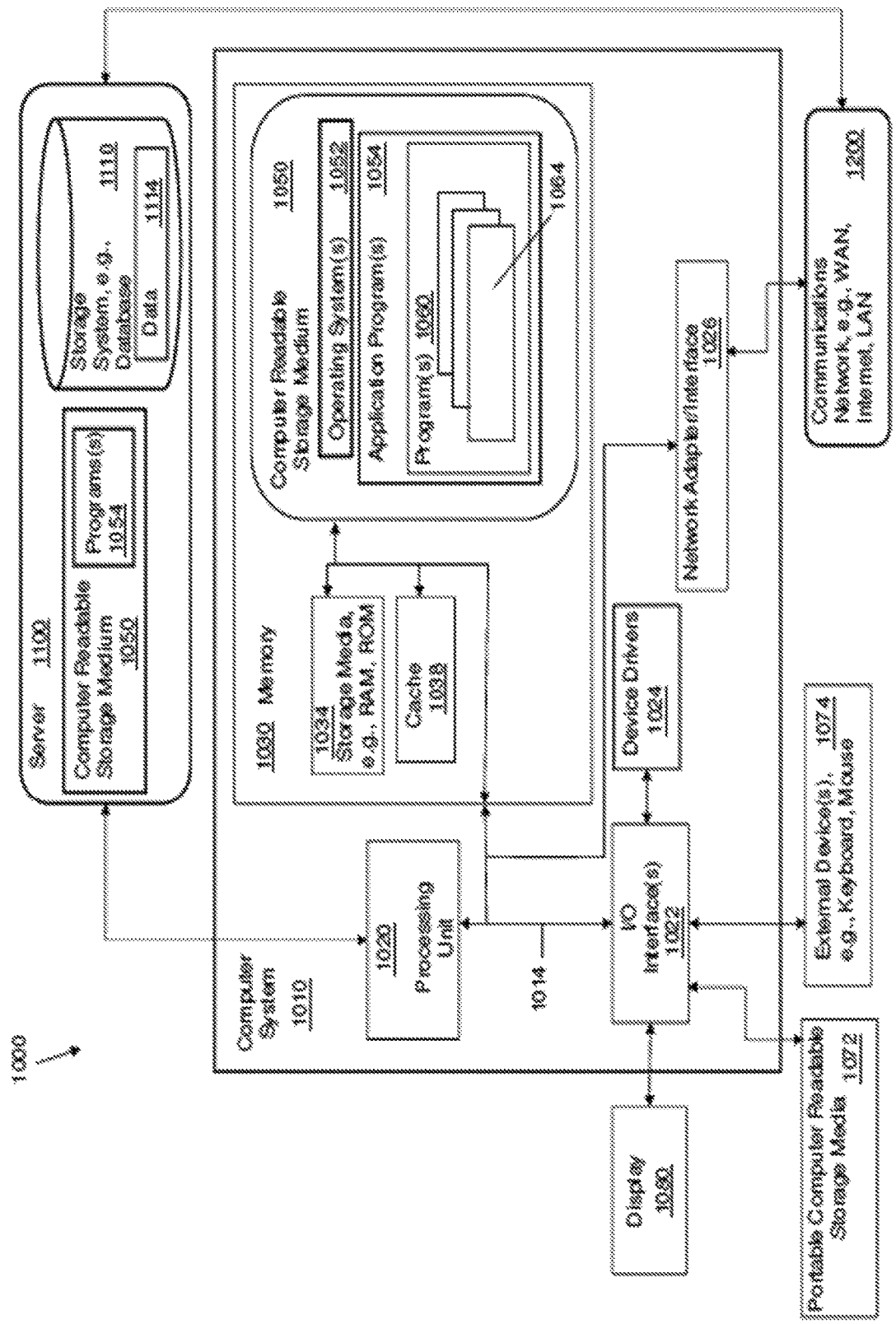
FIG. 4 is a block diagram depicting the hardware components of the environment based routing system of FIG. 1, in accordance with an embodiment of the invention.

Referring to FIG. 4, a system 1000 includes a computer system or computer 1010 shown in the form of a generic computing device. The methods 200 and 300 for example, may be embodied in a program(s) 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The methods 200 and 300 (FIGS. 2a, 2b, 3a, 3b), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 160-170 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
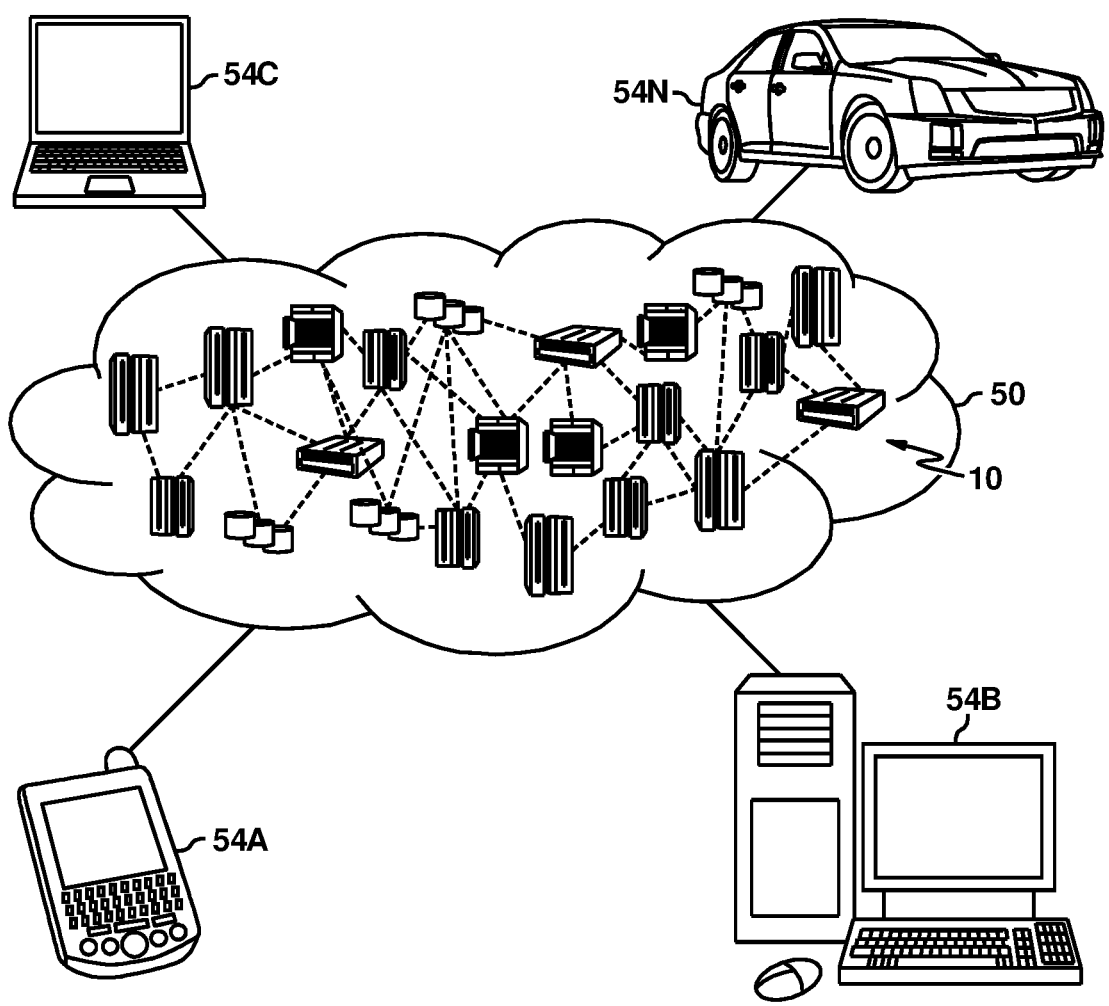
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
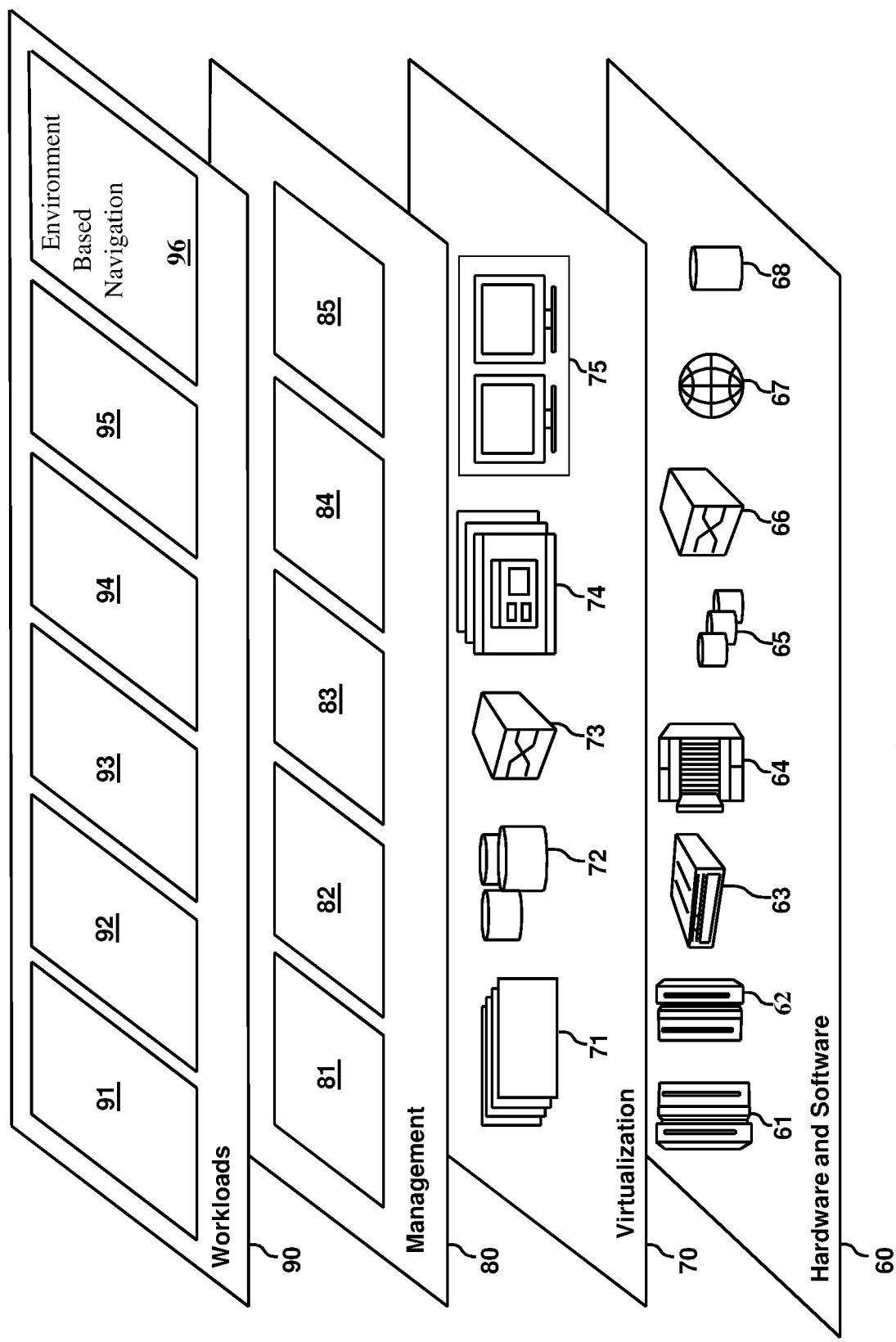
FIG. 6 illustrates a set of functional abstraction layers provided by the cloud computing environment of FIG. 5, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environment based navigation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for environment based navigation, the method comprising:
   collecting, by a computing device, environment map data, wherein the environment map data includes one or more environmental zones;
   receiving, by the computing device, one or more user environment preferences from a user that are based on the user's preferred senses, wherein the user environment preferences include a user's preferred environmental zones and non-preferred environmental zones; and
   receiving, by the computing device, a destination from the user via a user interface associated with the computing device; and
   determining and displaying a ranked list of routes to the destination based on the user environment preferences, wherein the ranked list is ordered based on a number of the user's preferred environmental zones such that a route comprising a highest number of the user's preferred environmental zones is displayed first and routes with more of the user's preferred environmental zones are displayed higher than routes with less of the user's preferred environmental zones.

2. The method as in claim 1, further comprising:
   receiving, by the computing device, a selection of one of the one or more routes from the user;
   detecting, by the computing device, an environmental zone on the selected route;
   comparing, by the computing device, the detected environmental zone to the one or more user environment preferences; and
   alerting, by the computing device, the user of the detected environmental zone.

3. A method as in claim 1, further comprising:
   detecting, by the computing device, an environmental zone; and
   adjusting, by the computing device, settings of a vehicle in response to detecting an environmental zone on the selected route, the vehicle communicating with the computing device via a communication network.

4. A method as in claim 3, wherein the adjusting, by the computing device, settings of a vehicle further comprises:
   closing at least one window of the vehicle in response to detecting a non-preferred environmental zone on the selected route; and
   opening the windows of the vehicle in response to detecting a preferred environmental zone on the selected route.

5. A method as in claim 3, wherein the adjusting, by the computing device, settings of a vehicle further comprises:
   circulating the air within the vehicle in response to detecting a non-preferred environmental zone on the selected route; and
   intaking air from the outside of the vehicle in response to detecting a preferred environmental zone on the selected route.

6. A method as in claim 1, wherein the environmental zones comprise one or more odor zones.

7. A method as in claim 1, wherein the environmental zones comprise one or more sound zones.

* * * * *